United States Patent

Uematsu et al.

[11] Patent Number: 5,782,506
[45] Date of Patent: Jul. 21, 1998

[54] FLEXIBLE PIPE

[75] Inventors: Toru Uematsu, Toyota; Hidenori Tateno, Nisshin; Katsujiro Tachikawa, Okazaki, all of Japan

[73] Assignee: Sanco Co., Ltd., Nagoya, Japan

[21] Appl. No.: 626,365

[22] Filed: Apr. 2, 1996

[30] Foreign Application Priority Data

Apr. 4, 1995 [JP] Japan ................... 7-078570

[51] Int. Cl.⁶ ............................................. F16L 27/11
[52] U.S. Cl. .......................... 285/227; 285/299; 285/300
[58] Field of Search .............................. 285/299, 300, 285/301, 226, 227

[56] References Cited

U.S. PATENT DOCUMENTS

| | | | |
|---|---|---|---|
| 2,712,456 | 7/1955 | McCreery | 285/299 |
| 3,369,829 | 2/1968 | Hopkins . | |
| 3,492,030 | 1/1970 | Harrison et al. | 285/300 |
| 3,633,946 | 1/1972 | Kazmierski, Jr. | 285/300 |
| 3,899,197 | 8/1975 | Coenders et al. | 285/227 |
| 5,083,817 | 1/1992 | Holzhausten et al. | 285/299 |
| 5,145,215 | 9/1992 | Udell | 285/300 |
| 5,340,165 | 8/1994 | Sheppard | 285/299 |
| 5,506,376 | 4/1996 | Godel | 181/208 |
| 5,542,715 | 8/1996 | Mantoan et al. | 285/300 |

FOREIGN PATENT DOCUMENTS

| | | |
|---|---|---|
| 0 448 769 | 10/1991 | European Pat. Off. . |
| 1428758 | 1/1966 | France ................... 285/300 |
| 1 476 151 | 9/1975 | Germany . |
| 43 18 343 | 12/1994 | Germany . |
| 58-86430 | 6/1983 | Japan . |
| 63-173588 | 11/1988 | Japan . |
| 9767 | 2/1895 | Switzerland . |
| 238971 | 3/1969 | U.S.S.R. ................... 285/301 |

*Primary Examiner*—Eric K. Nicholson
*Attorney, Agent, or Firm*—Cushman, Darby & Cushman IP Group of Pillsbury Madison & Sutro LLP

[57] ABSTRACT

In a flexible pipe having upstream side and downstream side inner tubes disposed internally of a bellows tube, the interference of the bellows tube with the inner tubes is prevented and the inner opening ends of both the inner tubes are disposed in the very close proximity to each other to prevent the impingement of a fluid on the bellows tube. For this purpose, the flexible pipe includes a bellows tube 1 having bellows portions 1e, 1f on the both sides thereof with each of the bellows portions composed of ridges 1c and valleys 1d and a straight tube portion 1g formed at the center of the bellows tube 1 in the longitudinal direction and having a diameter expanded to substantially the same diameter as that of the ridges 1c. The, the inner opening end 2d of one of inner tubes 2 and the inner opening end 3e of the other of the inner tubes 3 are disposed within a range of the straight tube portion 1g of the bellows tube 1 and face each other in close proximity to each other. A flare portion 3d may be formed in the inner opening end 3e of the other inner tube 3.

8 Claims, 3 Drawing Sheets

FLEXIBLE PIPE

BACKGROUND OF THE INVENTION

1. Field of the Invention

The present invention relates to a flexible pipe.

2. Description of the Related Art

A bellows-shaped flexible tube is conventionally used as a flexible pipe for an exhaust system of an automobile. However, when the entire region between both ends thereof is composed of bellows, flexure greater than necessary is produced which causes inconvenience.

To cope with this problem, JP-U-58-86430 conventionally discloses a flexible pipe composed of bellows-shaped flexible portions 101, 102 formed at both ends thereof and an intermediate portion composed of a straight tube portion 103 having substantially the same outside diameter as that of the ridges of the above flexible portions 101, 102 to thereby secure necessary rigidity, as shown in FIG. 2.

However, in the prior art shown in FIG. 2, an exhaust gas having a high temperature directly impinges on the inner surface of the flexible tube, causing the flexible tube to be damaged by heat.

As technology for preventing heat damage JP-U-63-173588 conventionally discloses an arrangement such that short inner tubes 202, 203 are provided to be located internally of a bellows tube 201 and are coupled with each other through an inner blade or interlock tube 204 to prevent an exhaust gas having a high temperature from directly impinging on the bellows tube 201 as shown in FIG. 3.

Since the prior art shown in FIG. 3 has the bellows tube 201 composed of bellows over the entire length thereof, the valleys of the bellows tube 201 are disposed in close proximity to the inner blade or interlock tube 204. Thus, when the bellows tube is bent, since the valleys come into contact and interfere with the inner blade or interlock tube 204, a problem arises in that an abnormal sound is made by the interference, flexibility is lost and further the inner wall surface of the bellows tube 204 becomes deteriorated.

In addition, it may be also contemplated to extend both inner tubes 202 and 203 to the vicinity of the center of the bellows tube 201 without using the interlock tube to prevent the direct impingement of an exhaust gas with the bellows tube 201 and improve the flow of the exhaust gas as shown in FIG. 4. In this structure, however, both the inner tubes 202, 203 interfere (come into contact) with the valleys of the bellows tube 201 when vibration and the like arise, by which a problem similar to the above one is also caused in this structure.

SUMMARY OF THE INVENTION

To solve the above problems, according to the present invention, there is provided a flexible pipe, which comprises:

a bellows tube having bellows portions composed of ridges and valleys on the both sides thereof in a longitudinal direction and a straight tube portion having a diameter expanded near to the outside diameter of the ridges in the bellows portions at the central portion thereof in the longitudinal direction, one of inner tubes provided with the bellows tube by being inserted thereinto from one of the openings thereof, and the other of the inner tubes provided with the bellows tube by being inserted thereinto from the other of the openings thereof, wherein the inner opening ends of the both inner tubes in the bellows tube are disposed within the range of the straight tube portion of the bellows tube and in confrontation with each other in close proximity to each other.

According to the present invention, at an ordinary time without vibration and the like, a large interval is produced between the inner opening ends of both inner tubes and the straight tube portion of the bellows tube in a radial direction.

When the bellows tube is bent by vibration and the like, the insides of both inner tubes approach to the bellows tube. However, since the large interval exists between the inner opening ends having the largest amount of displacement and the bellows tube in the straight tube portion as described above, the inner tubes do not interfere (come into contact) with the bellows tube in ordinary vibration. Consequently, since no interference problem is caused even if both inner tubes are extended to the center of the bellows tube, the inner opening ends of both inner tubes can be caused to approach to each other up to the limit state in which they do not interfere with each other.

Since the inner opening ends are disposed in the close proximity to each other as described above, a fluid emitted from one of the inner tubes effectively flows into the other of the inner tubes.

Further, in the flexible pipe according to the present invention, a flare portion may be formed in the inner opening end of the other of both inner tubes so that the diameter of the inner opening end of the other of the inner tubes may be made larger than that of the one of the inner tubes.

With this arrangement, the fluid more securely flows from one of the inner tubes into the other thereof.

DESCRIPTION OF PREFERRED EMBODIMENT

Figure 1:
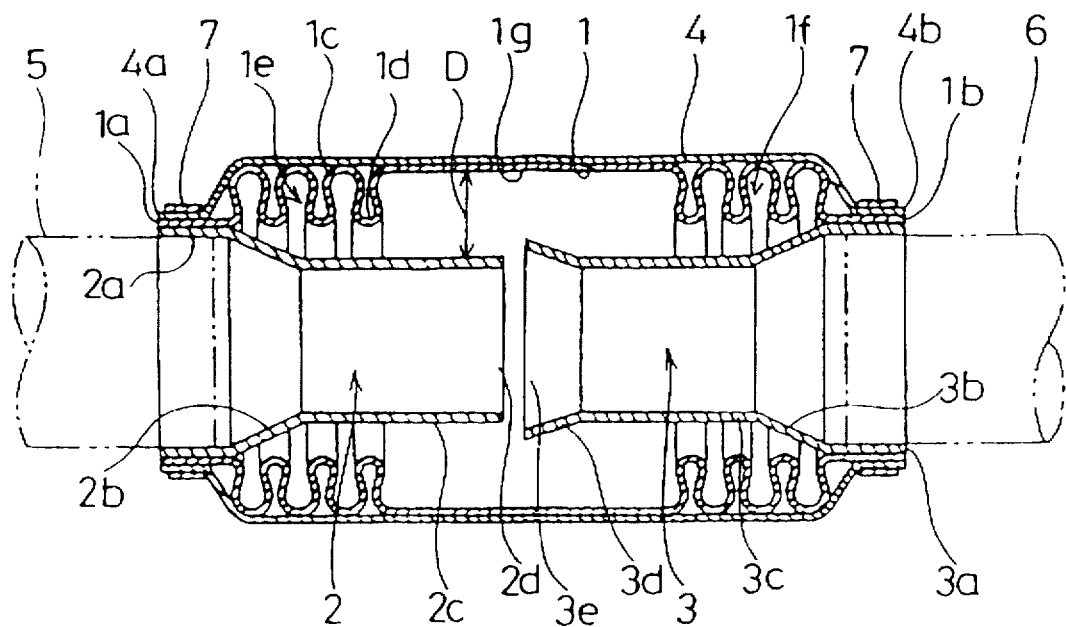
FIG. 1 is a cross sectional view showing an embodiment of a flexible pipe according to the present invention.
Figure 2:
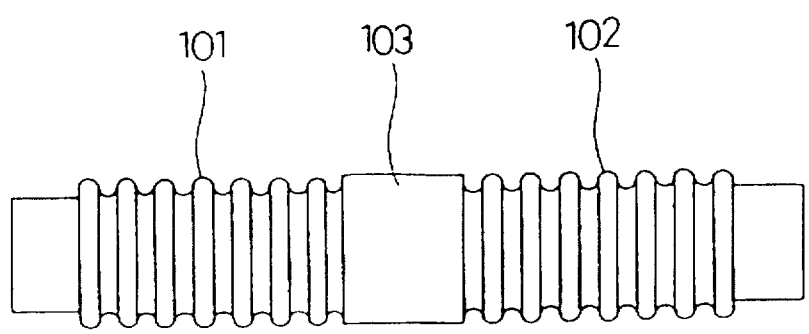
FIG. 2 is a side elevational view showing a first example of a conventional flexible pipe.
Figure 3:
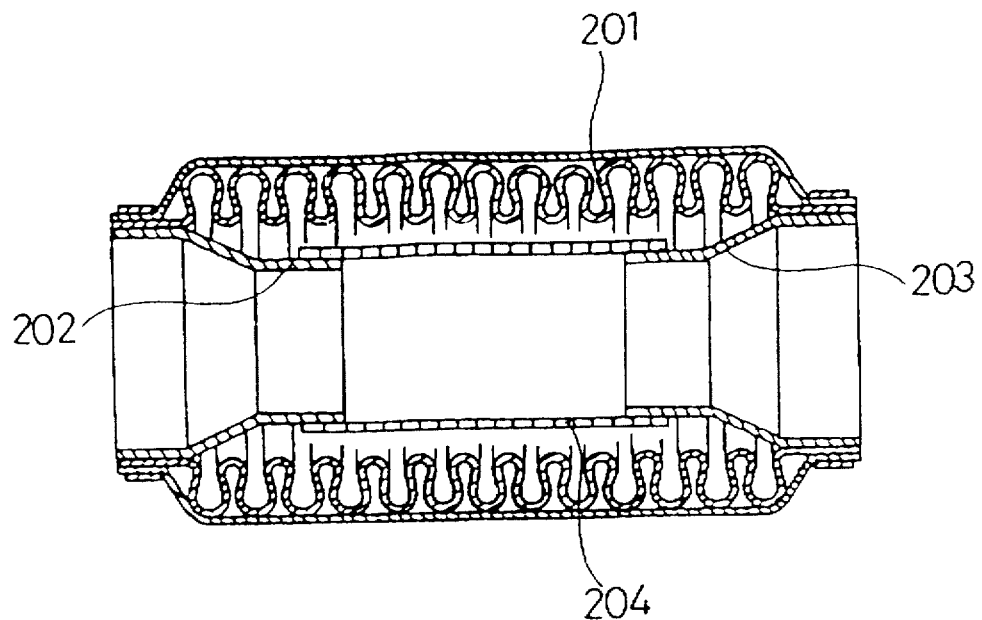
FIG. 3 is a cross sectional view showing a second example of the conventional flexible pipe.
Figure 4:
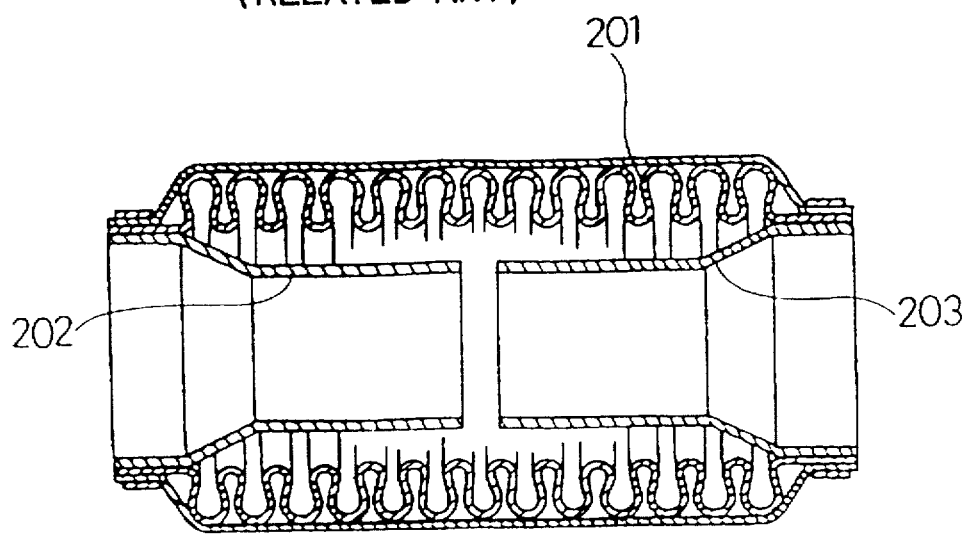
FIG. 4 is a cross sectional view of a virtual flexible pipe for explaining the present invention.

An embodiment of a flexible pipe according to present invention shown in FIG. 1 will be described below.

Numeral 1 denotes a bellows tube having straight-tube-shaped mounting portions 1a, 1b formed at both ends thereof. The bellows tube 1 has bellows portions 1e, 1f formed internally of both mounting portions 1a, 1b except in the central portion of the tube 1. Each of the bellows portions having ridges 1c and valleys 1d which continue in an axial direction. The valleys 1d of the bellows portions 1e, 1f have a tube diameter substantially similar to that of the mounting portions 1a, 1b.

Further, a straight-tube portion 1g which has a diameter expanded near to the outside diameter of the ridges in the bellows portions 1e, 1f is formed at the central portion of the bellows tube 1 and the straight-tube portion 1g is formed to be continuous to both bellows portions 1e, 1f. The length in the axial direction of the straight-tube portion 1g is set such that when the bellows tube 1 is bent by a relative bend or deviation of both inner tubes 2, 3, to be described later. The inner tubes 2, 3 do not interfere with the valleys 1d of the bellows portions 1e, 1f within an ordinary bending range.

Numeral 2 denotes one of the inner tubes inserted into the bellows tube 1 from the opening end at an end thereof and the inner tube 2 has a mounting portion 2a formed in a straight tube which is in contact and fitted into one of the mounting portions 1a of the bellows tube 1. The inside diameter of the one 2 of the inner tubes is reduced on a taper portion 2b so that the inner tube 2 continues to a diameter-reduced straight tube portion 2c and the extreme end thereof is located substantially at the center of the bellows tube 1 and is opened.

Figure 5:
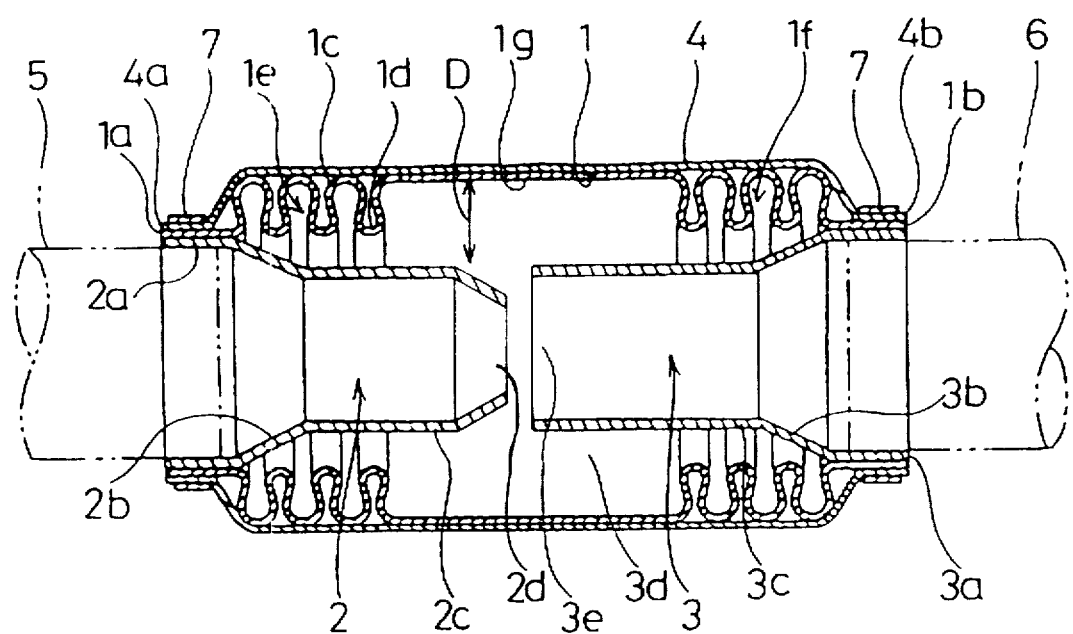
FIG. 5 is a cross sectional view showing another embodiment of the flexible pipe according to the present invention.

Numeral 3 denotes the other of the inner tubes inserted into the bellows tube 1 from the other open end thereof and the inner tube 3 has a mounting portion 3a formed in a straight tube which is in contact and fitted into the other mounting portion 1b of the bellows tube 1. The inside diameter of the other inner tube 3 is reduced in a taper portion 3b so that the inner tube 3 continues to a diameter-reduced straight tube portion 3c and a flare portion 3d is formed at the extreme end of the inner tube 3. The opening end 3e at the extreme end of the flare portion 3d has a diameter larger than the opening diameter of the diameter-reduced portion 2c of the one 2 of the inner tubes, as well as the outside diameter of the flare-shaped opening end of the inner tube 3 being formed substantially similar to the valley diameter of the bellows portions 1e, 1f. Note, the extreme end of the diameter-reduced portion 3c of the other inner tube 3 may be formed to a straight tube shape having the same diameter as that of the extreme end of the diameter-reduced portion 2c of the one 2 of the inner tubes. Further, the extreme end of the diameter-reduced portion 2c of the one 2 of the inner tubes may has a diameter which is more reduced than the diameter of the straight-tube-shaped extreme end of the diameter-reduced portion of the other inner tube 3, as shown in FIG. 5 of another embodiment according to the present invention.

Further, both inner tubes 2, 3 are disposed on the same axial line and the opening ends 2d, 3e on the inner sides thereof are disposed in close proximity in confrontation with each other substantially at the center in the axial direction of the bellows tube 1, that is, substantially at the center of the straight pipe portion 1g.

Numeral 4 denotes a flexible wire braider which entirely covers the outer periphery of the bellows tube 1 and both mounting portions 4a, 4b thereof cover both mounting portions 1a, 1b of the bellows tube 1.

Numeral 5 denotes one of pipes to be coupled such as, for example, an upstream side pipe of an exhaust system and numeral 6 denotes the other pipe to be coupled such as, for example, a downstream side pipe of the exhaust system, the former pipe being inserted and fitted into the base of the one 2 of the inner tubes and the latter pipe being inserted and fitted into the base of the other 3 of inner tube, respectively.

Numeral 7 denotes tightening bands wound around the outer surfaces of the mounting portions 4a, 4b at the both ends of the wire braider 4, the bands tightening and fixing the wire braider 4, the bellows tube 1 and both inner tubes 2, 3 to both pipes 5, 6.

Next, operation of the flexible pipe of the above embodiment will be described when it is used to the exhaust system of an automobile.

At an ordinary time without vibration and the like, the flexible pipe is in the state shown in FIG. 1 and has a large interval D defined between both inner tubes 2, 3 and the straight pipe portion 1g without valley of the bellows tube 1 at the inside opening ends 2d, 3e portions of both inner tubes 2, 3, that is, in the vicinity of the center of the bellows tube 1.

When the upstream side pipe 5 and the downstream side pipe 6 are relatively bent or deviate from each other by vibration and the like, the bellows tube 1 is bent to cause the inner surface of the bellows tube 1 and the outer sides of both the inner tubes 2, 3 approach to each other. At the time, the bellows tube 1 and both inner tubes 2, 3 are not caused to interfere (come into contact) with each other by bending due to ordinary vibration because the above large interval D is defined, when there is no vibration and the like, between the inner opening ends 2d, 3e portions of both the inner tubes 2, 3 which have a largest amount of dislocation and the straight pipe portion 1g at the center of the bellows tube 1.

Since no inconvenience arises even if the inner opening ends 2d, 3e of both inner tubes 2, 3 are extended to the center of the bellows tube 1 as described above, the respective inner opening ends 2d, 3e of both inner tubes 2, 3 can be caused to approach to each other up to the limit state in which they do not interfere with each other, by which an exhaust gas emitted from the upstream side inner tube 2 effectively flows into the downstream side inner tube 3, so that the exhaust gas of high temperature can be prevented from impinging on the inner surface of the bellows tube 1.

Since the flare portion 3d is formed in the inner opening end of the downstream side inner tube 3, the exhaust gas emitted from the upstream side inner tube 2 securely flows into the downstream side inner tube 3.

Further, since the flare portion 3d also has a function for preventing the interference between the opening ends 2d, 3e when they are vibrated, the exhaust gas can be made to more securely flow into the downstream side inner tube 3 by causing both opening ends 2d, 3e to more closely approach to each other, so that the impingement of exhaust gas on the bellows tube 1 can be further prevented.

As described above, according to the present invention, since the interference of the bellows tube with the inner tubes can be prevented, even if the bellows tube is bent by vibration and the like, both inner tubes can be disposed in confrontation with each other with the inner opening ends thereof located in close proximity to each other. With this arrangement, when the flexible pipe arranged, as described above, is used in an exhaust system, an exhaust gas emitted from the upstream side inner tube effectively flows into the downstream side inner tube, so that the impingement of the exhaust gas of high temperature on the inner surface of the bellows tube can be prevented, thereby preventing the deterioration of the bellows.

Further, according to the present invention, since the flare portion is formed to the inner opening end of the downstream side inner tube, the exhaust gas more securely flows into the downstream side inner tube, whereby the aforesaid effect can be more securely achieved.

What is claimed is:

1. A flexible pipe comprising:
    a bellows tube comprising:
        bellows portions including ridges and valleys on opposite ends of the bellows tube in a longitudinal directions, and
        a straight tube portion disposed at a central portion of the bellows tube between the bellows portions and having a diameter approximately the same as an outside diameter of the ridges in the bellows portions, the bellows portions being integrally formed with and fixedly attached to the straight tube portion;
    a first inner tube inserted into a first opening formed in the bellows tube; and a second inner tube inserted into a second opening formed in the bellows tube, wherein inner opening ends of the first and the second inner tubes in the bellows tube are disposed within the straight tube portion and the inner opening end of the first inner tube faces the inner opening end of the second inner tube, the inner opening ends being in close proximity to each other.

2. A flexible pipe according to claim 1, wherein taper portions are formed at a vicinity of respective inlets of the first and the second inner tubes to reduce a diameter thereof, respectively.

3. A flexible pipe according to claim 1, wherein a flare portion is formed in the inner opening end of the second inner tube and a diameter of the inner opening end of the second inner tube is made larger than a diameter of the inner opening end of the first inner tube.

4. A flexible pipe according to claim 3, wherein taper portions are formed at a vicinity of respective inlets of the first and the second inner tubes to reduce a diameter thereof, respectively.

5. A flexible pipe according to claim 1, wherein:

a flexible wire braider entirely covers an outer periphery of the bellows tubes and mounting portions of the flexible wire braider cover mounting portions of the bellows tube and are fixed thereto.

6. A flexible pipe according to claim 5, wherein taper portions are formed at a vicinity of respective inlets of the first and the second inner tubes to reduce a diameter thereof, respectively.

7. A flexible pipe according to claim 1, wherein a taper portion is formed in the inner opening end of the first inner tube to reduce a diameter of the first inner tube to thereby make the diameter of the inner opening end of the first inner tube smaller than a diameter of the inner opening end of the second inner tube.

8. A flexible pipe according to claim 1, wherein the first and the second inner tubes are aligned in a longitudinal direction of the bellows tube and the inner opening ends of the first and the second inner tubes are disposed substantially at a center of the straight tube portion.

* * * * *

UNITED STATES PATENT AND TRADEMARK OFFICE
CERTIFICATE OF CORRECTION

PATENT NO. : 5,782,506
DATED : July 21, 1998
INVENTOR(S) : Uemastsu, et. al.

It is certified that error appears in the above-identified patent and that said Letters Patent is hereby corrected as shown below:

Title page, [73], Assignee: change "Sanco Co., Ltd, Nagoya, Japan" to --Sango Co., Ltd., Nagoya, Japan--

Signed and Sealed this

Twelfth Day of September, 2000

Attest:

Q. TODD DICKINSON

*Attesting Officer*    *Director of Patents and Trademarks*